United States Patent [19]
Araki

[11] Patent Number: 5,844,796
[45] Date of Patent: Dec. 1, 1998

[54] MACHINE CONTROL DEVICE

[75] Inventor: Kazuhiro Araki, Okazaki, Japan

[73] Assignee: Minolta Co., Ltd., Osaka, Japan

[21] Appl. No.: 503,322

[22] Filed: Jul. 17, 1995

[30] Foreign Application Priority Data

| Jul. 19, 1994 | [JP] | Japan | 6-167004 |
| Jul. 19, 1994 | [JP] | Japan | 6-167005 |

[51] Int. Cl.$^6$ .................................................. G05B 19/42
[52] U.S. Cl. ........................ 364/191; 399/77; 395/712
[58] Field of Search ................................ 364/184, 187, 364/191–193; 395/700, 442, 775, 430, 182.03–182.05, 652, 651, 712, 828, 830; 355/204, 205, 207; 399/77, 83

[56] References Cited

U.S. PATENT DOCUMENTS

| 5,430,877 | 7/1995 | Naylor | 395/700 |
| 5,487,161 | 1/1996 | Koenck et al. | 395/700 |
| 5,522,076 | 5/1996 | Dewa et al. | 395/652 |
| 5,590,373 | 12/1996 | Whitley et al. | 395/828 |

FOREIGN PATENT DOCUMENTS

| 4-70768 | 3/1992 | Japan . |
| 4-294183 | 10/1992 | Japan . |
| 4-365058 | 12/1992 | Japan . |
| 5-80602 | 4/1993 | Japan . |
| 5-80608 | 4/1993 | Japan . |
| 5-80610 | 4/1993 | Japan . |
| 5-88433 | 4/1993 | Japan . |
| 5-216637 | 8/1993 | Japan . |
| 5-224478 | 9/1993 | Japan . |
| 5-232758 | 9/1993 | Japan . |
| 5-297654 | 11/1993 | Japan . |

*Primary Examiner*—Paul P. Gordon
*Assistant Examiner*—Steven R. Garland
*Attorney, Agent, or Firm*—Burns, Doane, Swecker & Mathis, LLP

[57] ABSTRACT

A machine control device capable of accurately rewriting a control program of a memory for controlling a mechanical device. The machine control device includes a first memory in which a control program is stored, a controller which controls operation of the mechanical device in accordance with the control program stored in the first memory, and a removable second memory in which a control program and a rewrite program are stored. The controller replaces the control program in the first memory with the control program in the second memory in accordance with the rewrite program stored in the second memory when the second memory is installed.

16 Claims, 8 Drawing Sheets

MACHINE CONTROL DEVICE

BACKGROUND OF THE INVENTION

1. Field of the Invention

The present invention relates to a machine control device, and more specifically to a control device for controlling the operation of a mechanical device in accordance with a control program.

2. Description of the Related Art

Controlling a mechanical device is generally accomplished in accordance with a program in a memory (control program and data; hereinafter referred to as "control program"). The control program of a mechanical device may require revision and additions for multiple functions and to correct defects. It is therefore desirable that revisions and additions to control programs and the like be easily accomplished.

For example, Japanese Unexamined Patent Application No. HEI5-80602 discloses a control device which rewrites control programs stored in an EEPROM (electrically erasable programmable read-only memory) 802 to control programs transmitted from an external device.

In the device disclosed in Japanese Unexamined Patent Application No. HEI5-80602, rewriting of the control programs stored in the EEPROM 802 is accomplished via a rewrite program stored beforehand in a ROM (read only memory) 803. Thus, even if the rewrite program is defective, it cannot be easily revised. Furthermore, when the rewrite program is defective, rewriting of the control program stored in EEPROM 802 cannot be accurately accomplished.

SUMMARY AND OBJECTS

In view of the previously described disadvantages, an object of the present invention is to provide a machine control device capable of accurately rewriting the contents of a memory for controlling a mechanical device.

In order to eliminate the aforesaid disadvantages, the present invention includes a first memory means for storing contents for controlling the operation of a mechanical device, a control means for controlling the operation of said mechanical device in accordance with the contents stored in said first memory means, and a removable second memory means for storing contents for controlling the operation of said mechanical device, and a rewrite program for rewriting the content of said first memory means, wherein said control means replaces the contents of the first memory means with the contents of the second memory means in accordance with the rewrite program stored in said second memory means when said second memory means is installed.

The contents stored in said first memory means and said second memory means are control programs.

The rewrite program is stored at the top of a predetermined address in said second memory means.

The second memory means which stores the contents for rewriting the contents of the first memory means is first installed. The control means executes the rewrite program in the second memory means.

BRIEF DESCRIPTION OF THE DRAWINGS

FIG. 8b is an illustration showing the condition where the memory card is inserted into the card socket shown in FIG. 8a.

DESCRIPTION OF THE PREFERRED EMBODIMENTS

Figure 1:
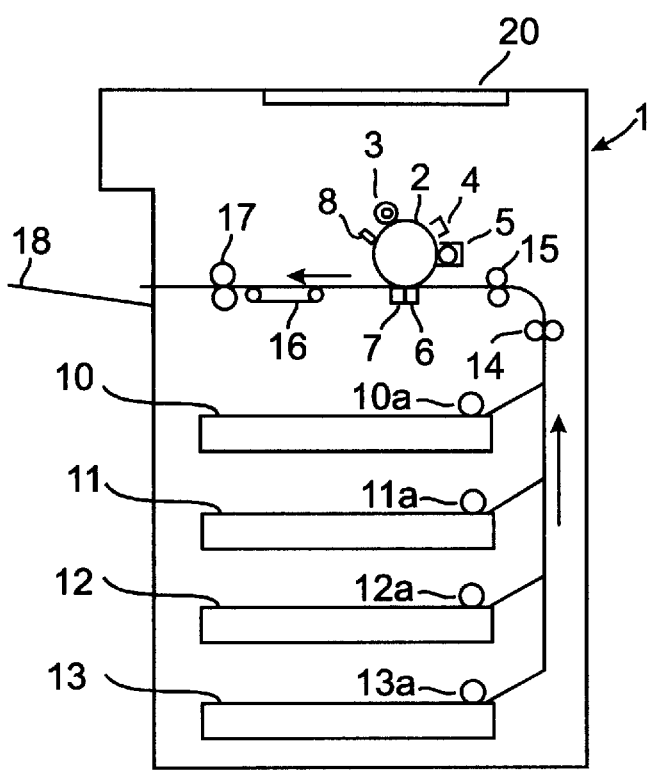
FIG. 1 is a schematic view of a copying apparatus related to the present invention.

FIG. 1 is a brief section view showing an electrophotographic copying apparatus 1 related to the present invention. A rotatably driven photosensitive drum 2 is disposed in the center portion of the copying apparatus 1. Arranged sequentially around the periphery of photosensitive drum 2 are an eraser lamp 3, a charger 4, a developing device 5, a transfer charger 6, a separation charger 7, and a cleaner 8. Paper cassettes 10~13 are provided at the bottom section of copying apparatus 1. To make a copy, an image of a document disposed on a glass platen 20 is optically exposed onto the surface of the photosensitive drum 2, which has been uniformly charged by the charger 4, so as to form an electrostatic latent image thereon. After the aforesaid latent image is developed by the developing device 5, the developed image is transferred onto a copy sheet by the transfer charger 6. When the photosensitive drum 2 is rotated after the aforesaid image transfer, residual toner remaining on the drum surface is removed therefrom by the cleaner 8, and the residual charge remaining on the drum surface is removed by the eraser lamp 3. On the other hand, the copy sheet is fed from one cassette among paper cassettes 10~13 via take-up rollers 10a~13a, and is delivered to the position of the transfer charger 6 via the transport roller 14 and the timing roller 15. After image transfer, the copy sheet is separated from photosensitive drum 2 via the corona discharge of the separation charger 7 and the stiffness of the paper itself, and thereafter transported to a transport belt 16 and fixing device 17, and ultimately discharged to a discharge tray 18.

Figure 2:
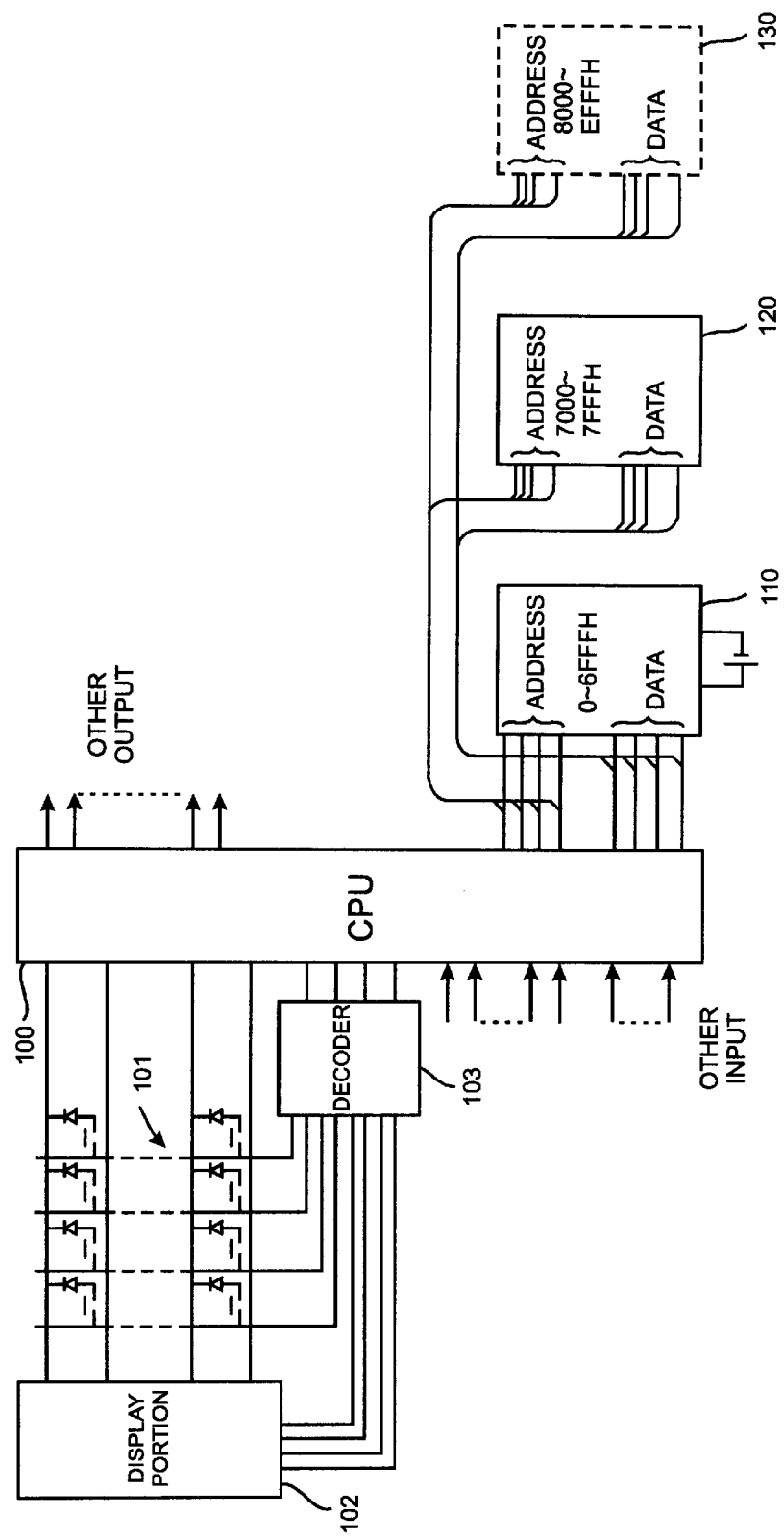
FIG. 2 is a block diagram showing an embodiment of the control circuit of the present invention.

FIG. 2 shows the control device for controlling copying apparatus 1. This control device is an embodiment of the present invention. Various key switches 101 and displays 102 provided on the operation panel of copying apparatus 1 are connected to the input/output (I/O) pins of central processing unit (CPU) 100 (control means). The various elements of the apparatus such as the previously mentioned photosensitive drum 2 are controlled via output signals from CPU 100.

A program memory 110 and a data memory 120 are connected to the address/data bus of the CPU 100. The program memory 110 is a nonvolatile random access memory (RAM) with a battery backup, and stores the control program. That is, the program memory 110 corresponds to the first memory means. The data memory 120 is a read only memory (ROM), and stores various types of data for controlling the copying apparatus 1. The CPU 100 controls the various operations of the copying apparatus 1 by executing the control program in the program memory 110 using the control data stored in the data memory 120.

An optional memory 130 may be connected to the address/data bus of the CPU 100. The optional memory 130 is a ROM, which stores a control program and a rewrite program for rewriting the control program stored in the program memory 110, and corresponds to the second memory means. The CPU 100 can rewrite the control program stored in the program memory 110 with the control program stored in the optional memory 130 by executing the rewrite program stored in the optional memory 130.

Figure 7:
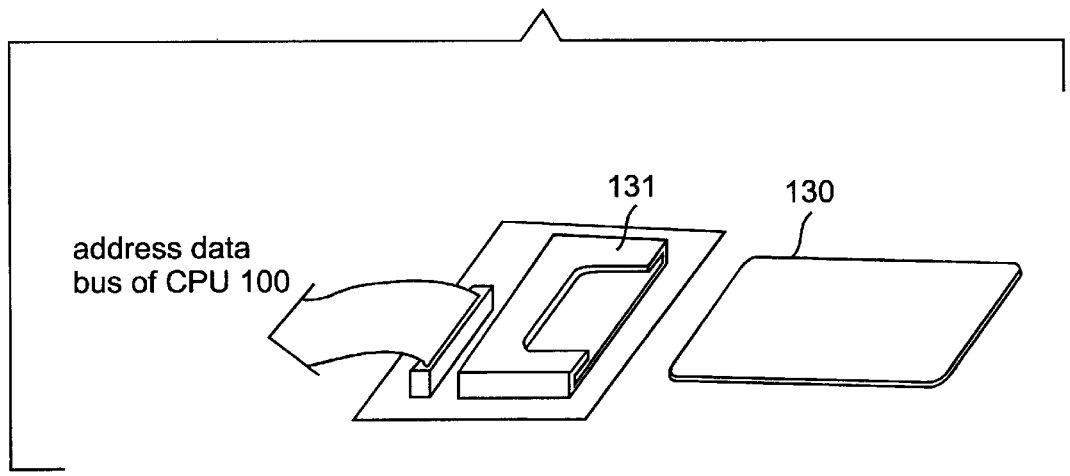
FIG. 7 is an illustration showing an optional memory in the form of a card memory, and a card socket provided at the copying machine.

As shown in FIG. 7, the optional memory 130 may be a memory card. The memory card is inserted into a card socket 131 provided at the copying machine 1, so that the optional memory 130 is connected to the address/data bus of the CPU 100. Further, the optional memory 130 may be an EPROM which is placed on a substrate with an IC socket.

The CPU 100 allocates addresses 00000(H)~6FFFF(H) to the program memory 110, addresses 70000(H)~7FFFF(H) to the data memory 120, and addresses 80000(H)~EFFFF(H) to the optional memory 130.

Figure 3:
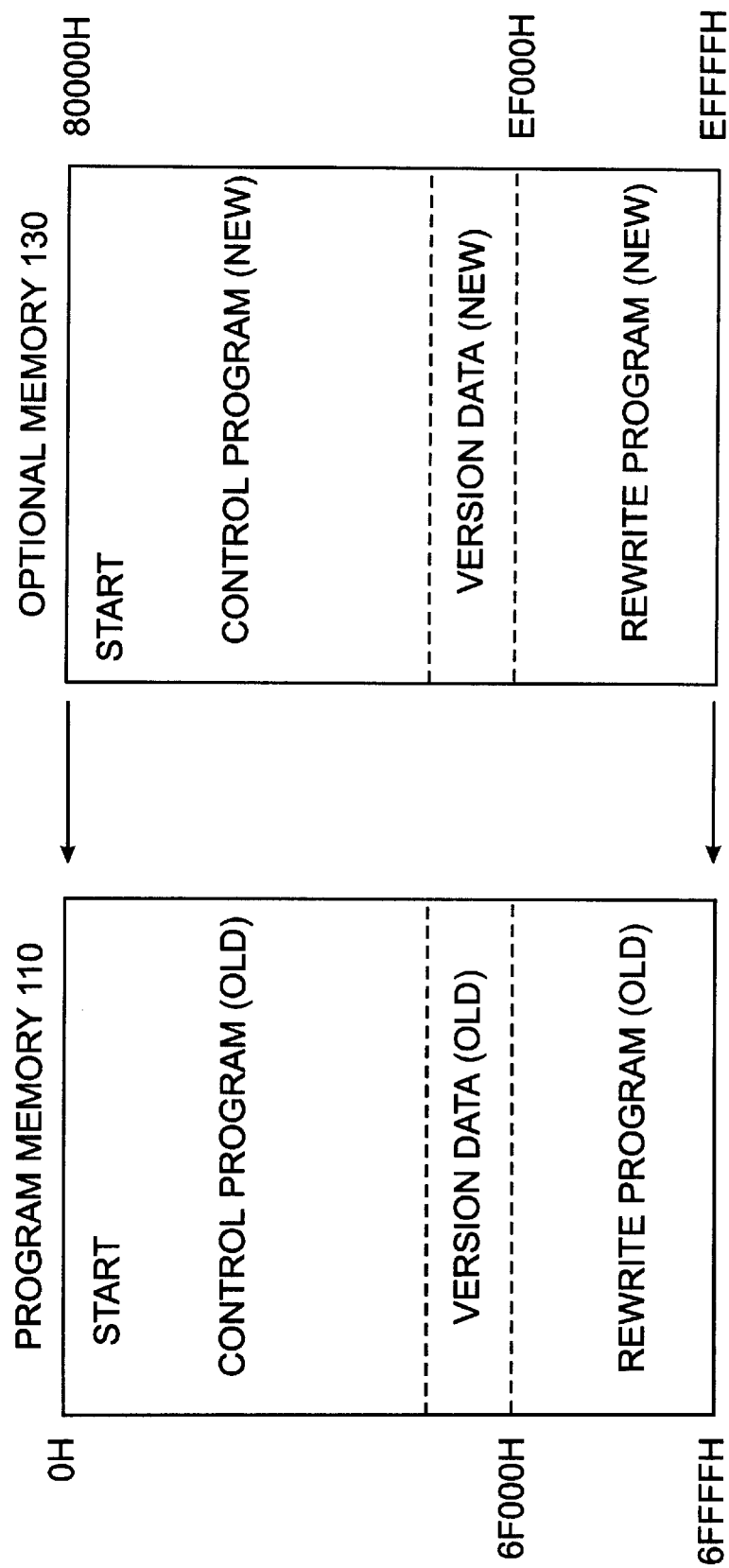
FIG. 3 is an illustration showing the memory spaces of a program memory 110 and an optional memory 130.

FIG. 3 shows the memory space of the program memory 110 and the optional memory 130. The program memory 110 and the optional memory 130 both store control programs, version data, and the rewrite program. Control programs are programs for controlling the operations of the copying apparatus 1, and are stored at the top address 00000(H) in the program memory 110, and at the top address 80000(H) in the optional memory 130. The rewrite program is a program for rewriting the control program and the like stored in the program memory 110, and is stored at the top address 6F000(H) in the program memory 110, and at the top address EF000(H) in the optional memory 130. The program memory 110 and the optional memory 130 store version information indicating the version of the control program stored in the respective memories at the address immediately in front of the rewrite program. In the following description, the control program stored in the program memory 110 is referred to as "old control program" and the rewrite program stored in the program memory 110 is referred to as "old rewrite program." Similarly, the control program stored in,the optional memory 130 is referred to as "new control program" and the rewrite program stored in the optional memory 110 is referred to as "new rewrite program."

The control executed by the CPU 100 for rewriting the control program stored in the program memory 110 is described below.

Figure 4:
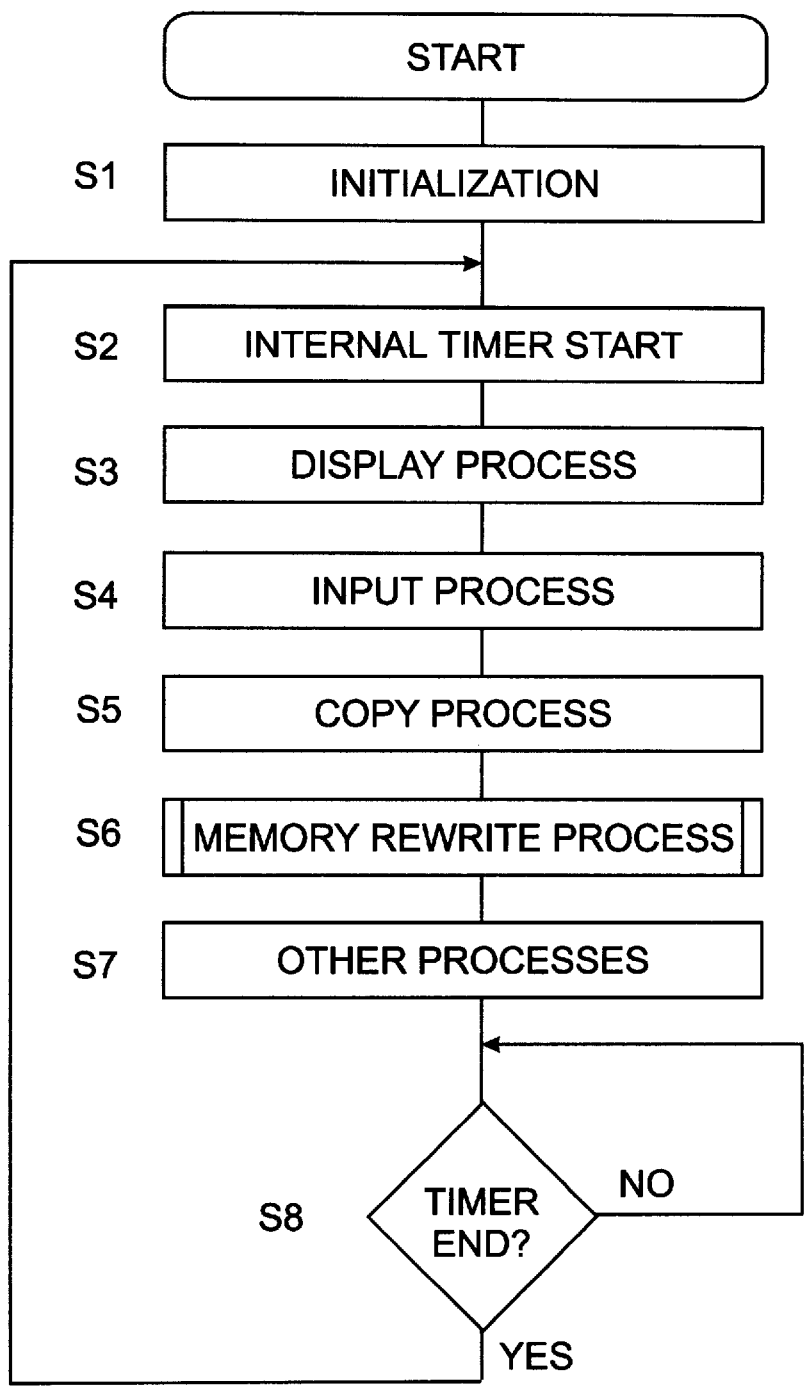
FIG. 4 is a flow chart showing the main routine of the control program stored in the program memory 110.

FIG. 4 is a flow chart showing the main routine of the control executed by the CPU 100. When the CPU 100 is reset and a program starts, initialization is executed (step S1). Initialization is a process which clears the internal RAM and initializes the various types of registers and the like of the CPU 100, and sets the initialization state of the copying apparatus 1.

Then, an internal timer built into the CPU 100 is started (step S2); the value of the timer is set beforehand by the initialization. The display process (step S3), the input process (step S4), the copy process (step S5), the memory rewrite process (step S6), and the other processes (step S7) are sequentially executed. When all subroutine processes are completed, the end of the internal timer set in step S1 is awaited (step S8), and when one routine ends, the program returns to step S2.

Figure 5:
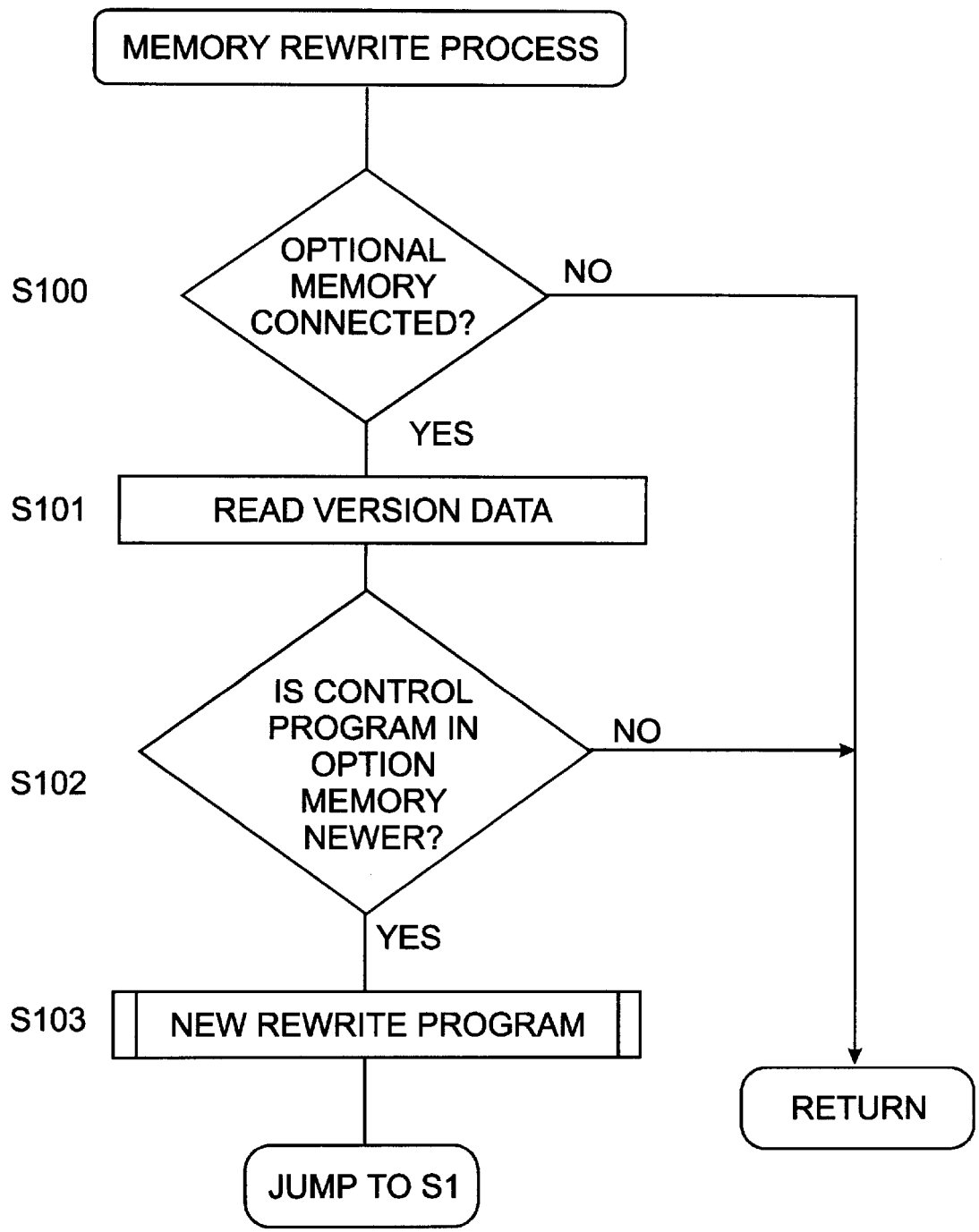
FIG. 5 is a flow chart showing the memory rewrite process subroutine of the control program stored in program memory 110.

FIG. 5 is a flow chart showing the memory rewrite process subroutine (step S6). This subroutine is the process for transferring the control program of the optional memory 130 to the program memory 110 when the optional memory 130 is connected.

First, a check is made to determine whether or not the optional memory 130 is connected (step S100). The presence/absence of the optional memory 130 can be determined by reading the address space of the optional memory 130. The optional memory 130 may be constructed so as to input a signal to the CPU 100 indicating that the optional memory 130 is connected.

Figure 8A:
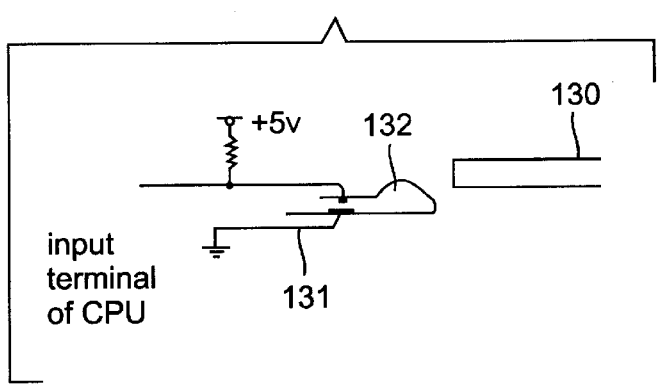
FIG. 8a is an illustration showing one example wherein an optional memory and the card socket as shown in FIG. 7 is constructed so as to input a signal to the CPU indicating that the optional memory is connected.
Figure 8B:
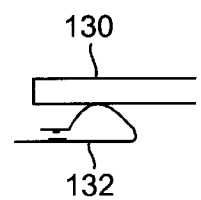

For example, a switch 132 may be provided in the card socket 131 as shown in FIG. 8a. When the memory card 130 is inserted into the card socket 131, the switch 132 is closed as shown in FIG. 8b, so that a signal is input to the CPU 100 indicating that the memory card 130 is connected. When the memory card 130 is withdrawn from the card socket 131, the switch 132 is open.

Figure 9:
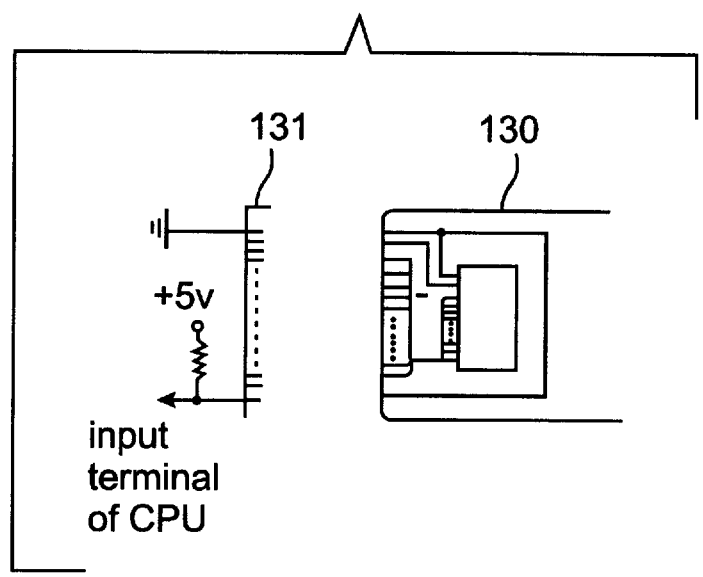
FIG. 9 is an illustration showing another example wherein an optional memory and a card socket as shown in FIG. 7 is constructed so as to input a signal to the CPU indicating that the optional memory 130 is connected.

Moreover, for example, the memory card 130 may be constructed to have the circuit as shown in FIG. 9. When the memory card 130 is inserted into the card socket 131, a voltage value flows to an input terminal of the CPU and is varied from 5v to 0v, so that the signal is input to the CPU indicating that the optional memory 130 is connected.

When the connection of the optional memory 130 has been verified, version information is read from the optional memory 130 (step. S101), and compared with version information stored in the program memory 110 (step S102). When the versions of the control program stored in the optional memory 130 and the version of the control program stored in the program memory 110 are identical, or when the control program stored in the optional memory 130 is older (step S102: NO), the program returns to the main routine.

On the other hand, when the version of the control program stored in the optional memory 130 is newer than the version of the control program stored in the program memory 110 (step S102: YES), the new rewrite program stored in the optional memory 130 is executed to transfer the control program stored in the optional memory 130 to the program memory 110 (step S103). After the new rewrite program has ended (step S103), the program jumps to the initialization process, i.e., the initial process of the main routine (step S1).

When the optional memory 130 is attached to the CPU 100 (e.g., via the address/data bus), the comparison and transfer process described above and in FIG. 5 occur automatically.

Figure 6:
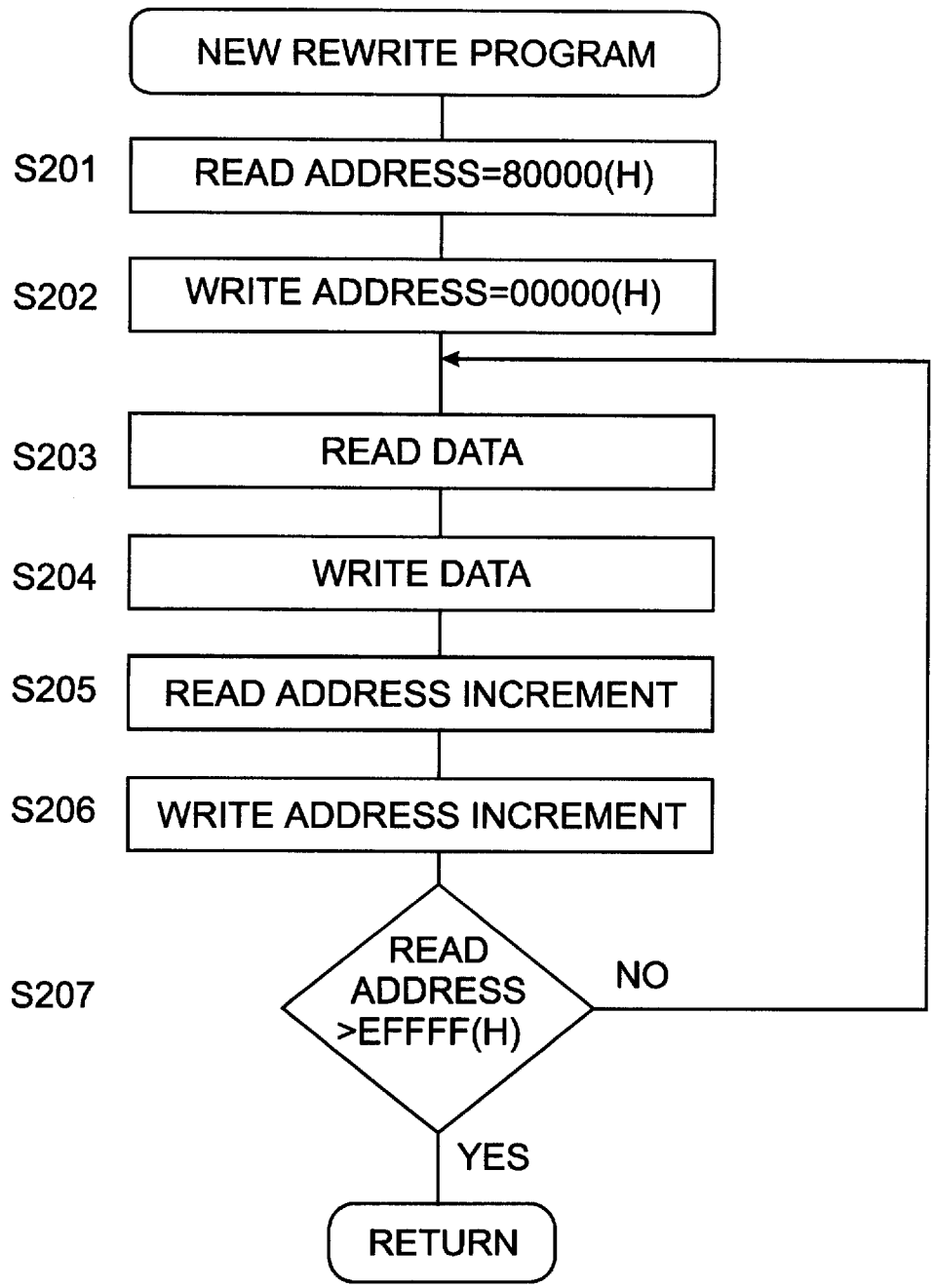
FIG. 6 is a flow chart showing the new rewrite program stored in optional memory 130.

FIG. 6 is a flow chart showing the new rewrite program (step S103).

First, read address is initialized at 80000(H) (step S201), and write address is initialized at 00000(H) (step S202). Then, data are read from the memory specified by the read address, and said data are written to the memory specified by the write address (steps S203, S204). Thereafter, the read address and write address are incremented (steps S205, S206). A check is made to determine whether or not the end of the read address exceeds value EFFFF(H) (step S207). If the read address exceeds EFFFF(H) (step S207: YES), the new rewrite program ends because all data has been transferred to the program memory 110. On the other hand, if the read address does not exceed EFFFF(H) (step S207: NO), the routine returns to step S203 and data read/write continues because data to be transferred to the program memory 110 remains in the optional memory 130. The control program and the like (control program, version information, and rewrite program) previously stored in the program memory 110 are completely rewritten so as to be replaced by the programs from the optional memory 130 by the aforesaid process.

As described above, the rewriting of data stored in the program memory 110 can be easily revised even when there are defects in the old rewrite program stored in the program memory 110 because processing is accomplished by the new rewrite program stored in the optional memory 130. Furthermore, since the rewrite program is also stored in the memory in which is stored the new control program to be rewritten, the rewrite program is the most suitable program in relation to the new control program. For example, when only a part of the old control program is to be revised, the time required to rewrite said control program can be reduced. Accordingly, downtime can be reduced relative to the mechanical device for which the control program is to be rewritten.

Although the present embodiment has been described in terms of rewriting the control program stored in the program memory 110, if constructed such that the data memory 120 is a rewritable nonvolatile memory (e.g., RAM with battery backup), the control program and the like stored in the data memory 120 may be rewritten. In such circumstance, control data may be stored beforehand in the optional memory 130, and the readout address specified in step S202 of FIG. 6 may be set at 70000(H).

In a machine control device for controlling the operations of said machine in accordance with the contents stored in a first memory means, the contents of said first memory means can be easily rewritten simply by connecting the second memory means to the control device. Furthermore, the rewriting of the content stored in the first memory means is controlled in accordance with the rewrite program stored in the second memory means, such that the content of the first memory means normally can be rewritten by the new rewrite program. Thus, even when the old rewrite program is defective, the content stored in the aforesaid first memory means can be reliably rewritten without being influenced by said defects.

The rewrite program is stored at the top of a predetermined address in the second memory means, such that when the control means executes the rewrite program, the rewrite program can be easily executed because it is unnecessary to check the position of the rewrite program. The second memory means may also be removable, and the rewrite program may be realized in various sizes.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A machine controlled by an operation comprising:
   a controllable element;
   a first memory in which a control program is stored;
   a controller, connected with said controllable element and said first memory, which controls operation of said controllable element in accordance with the control program stored in said first memory;
   a removable second memory, removably connectable with said controller, in which a control program and a rewrite program are stored;
   said controller includes means for replacing the control program in the first memory with the control program in the second memory in accordance with the rewrite program stored in said second memory when said second memory is connected with the controller; and
   means for activating the replacing means by connecting the second memory with the controller.

2. The machine as claimed in claim 1, wherein
   said first memory stores version information of the control program stored in the first memory;
   said second memory stores version information of the control program stored in the second memory;
   said controller replaces the control program of the first memory with the control program of the second memory when the version of the control program stored in the second memory is newer than the version of the control program stored in the first memory.

3. The machine as claimed in claim 2, wherein
   said controller does not replace the control program of the first memory with the control program of the second memory when the version of the control program stored in the second memory is not newer than the version of the control program stored in the first memory.

4. The machine as claimed in claim 1, further comprising:
   a connector which is connected to said controller and to which said second memory is removably connected.

5. The machine as claimed in claim 4, wherein said second memory is an integrated circuit.

6. The machine as claimed in claim 4, wherein said second memory is an IC card.

7. The machine as claimed in claim 6, wherein said connector includes a detector which detects the IC card when the IC card is connected to the connector.

8. The machine as claimed in claim 6, wherein the machine is an electrophotographic copying apparatus.

9. A machine controlled by an operation program comprising:
   a controllable element;
   a first memory in which an original control program is stored;
   a controller, connected with said controllable element and said first memory, which controls operation of said controllable element in accordance with the control program stored in said first memory;
   a removable second memory, removably connectable with said controller, in which a new control program and a rewrite program are stored; and
   said controller includes means for writing said new control program into said first memory while erasing the original control program in accordance with the rewrite program stored in said second memory when said second memory is connected with the controller and
   means for activating the writing means by connecting the removable second memory with the controller.

10. The machine as claimed in claim 9, wherein said controllable element includes means for forming an image on a copy sheet.

11. The machine as claimed in claim 10, wherein said first memory is a RAM with a battery back-up.

12. In a machine comprising a controllable element, a memory for storing a control program and a controller for controlling operation of the controllable element based on the control program, a method comprising the steps of:
   supplying a new control program and a writing program from an external device to the machine;

writing the externally supplied new control program into the memory in accordance with the externally supplied writing program; and activating the writing step by connecting the external device to the machine.

13. The method as claimed in claim 12, further comprising the steps of:

comparing a version of the control program stored in the memory with a version of the new control program externally supplied; and allowing the writing step when the version of the new control program is newer than the version of the control program stored in the memory.

14. The method as claimed in claim 13, further comprising the steps of:

inhibiting the writing step when the version of the new control program externally supplied is not newer than the version of the control program stored in the memory.

15. The method as claimed in claim 13, wherein the external device is a detachable memory.

16. The method as claimed in claim 15, wherein the comparing step occurs automatically when the detachable memory is attached to the controller.

* * * * *